US012621513B2

(12) United States Patent
Terem et al.

(10) Patent No.: US 12,621,513 B2
(45) Date of Patent: May 5, 2026

(54) CLOUD MEDIA PLAYER

(71) Applicant: Synamedia Limited, Staines Upon Thames (GB)

(72) Inventors: Amotz Terem, Jerusalem (IL); Reuven Nimrod, Mevaseret Zion (IL); Avi Fruchter, Neve Daniel (IL); Enrique Gerstl, Maale Michmash (IL)

(73) Assignee: SYNAMEDIA LIMITED, Maidenhead (GB)

( * ) Notice: Subject to any disclaimer, the term of this patent is extended or adjusted under 35 U.S.C. 154(b) by 0 days.

(21) Appl. No.: 18/116,480

(22) Filed: Mar. 2, 2023

(65) Prior Publication Data

US 2024/0298052 A1    Sep. 5, 2024

(51) Int. Cl.
H04N 21/24 (2011.01)
H04L 65/75 (2022.01)
H04N 21/435 (2011.01)
H04N 21/858 (2011.01)

(52) U.S. Cl.
CPC ......... H04N 21/2402 (2013.01); H04L 65/75 (2022.05); H04N 21/4355 (2013.01); H04N 21/8586 (2013.01)

(58) Field of Classification Search
CPC ........... H04N 21/44226; H04N 21/252; H04N 21/25866; G06F 16/40; G06F 16/535; G06F 16/70
See application file for complete search history.

(56) References Cited

U.S. PATENT DOCUMENTS

| | | | |
|---|---|---|---|
| 10,484,446 B1* | 11/2019 | Waggoner | ............... H04L 65/80 |
| 11,126,622 B1* | 9/2021 | Hazel | ................ G06F 16/24539 |
| 11,445,248 B1* | 9/2022 | Leigh | ................... H04N 21/235 |
| 2007/0094276 A1* | 4/2007 | Isaac | ................ H04N 21/42684 |
| 2015/0256577 A1* | 9/2015 | Gutierrez Vilaro ... H04L 67/101 709/203 |
| 2016/0366202 A1 | 12/2016 | Phillips et al. | |
| 2017/0359628 A1 | 12/2017 | Sachdev et al. | |
| 2019/0057420 A1* | 2/2019 | Wang | ...................... G06F 21/62 |

OTHER PUBLICATIONS

Extended European Search Report dated May 8, 2024, European Application No. 24156413.7, pp. 1-8.

* cited by examiner

*Primary Examiner* — Yassin Alata
(74) *Attorney, Agent, or Firm* — Fernando & Partners, LLP

(57) ABSTRACT

Techniques for providing multimedia content by a cloud media player are described herein. In some embodiments, the cloud media player is hosted by one or more servers that include one or more processors and a non-transitory memory. The cloud media player receives a request to play a media content item at a client device. The cloud media player identifies, based at least in part on client conditions at time of the request, one or more units of the media content item for the client device to download according to a manifest obtained and parsed by the one or more servers. The cloud media player then signals to the client device the one or more units to download.

19 Claims, 7 Drawing Sheets

100

400

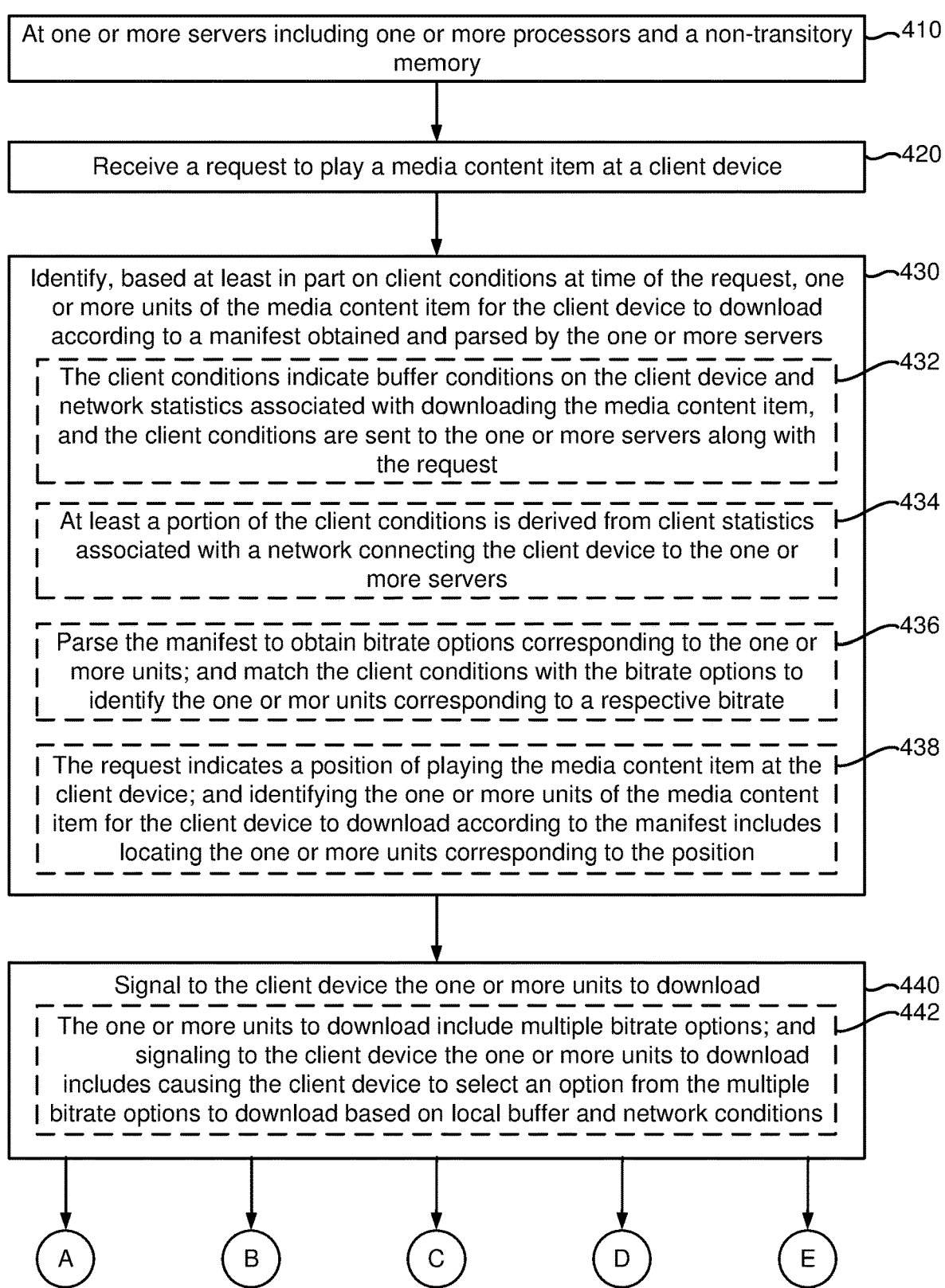

At one or more servers including one or more processors and a non-transitory memory ⟶410

Receive a request to play a media content item at a client device ⟶420

Identify, based at least in part on client conditions at time of the request, one or more units of the media content item for the client device to download according to a manifest obtained and parsed by the one or more servers ⟶430

The client conditions indicate buffer conditions on the client device and network statistics associated with downloading the media content item, and the client conditions are sent to the one or more servers along with the request ⟶432

At least a portion of the client conditions is derived from client statistics associated with a network connecting the client device to the one or more servers ⟶434

Parse the manifest to obtain bitrate options corresponding to the one or more units; and match the client conditions with the bitrate options to identify the one or mor units corresponding to a respective bitrate ⟶436

The request indicates a position of playing the media content item at the client device; and identifying the one or more units of the media content item for the client device to download according to the manifest includes locating the one or more units corresponding to the position ⟶438

Signal to the client device the one or more units to download ⟶440

The one or more units to download include multiple bitrate options; and signaling to the client device the one or more units to download includes causing the client device to select an option from the multiple bitrate options to download based on local buffer and network conditions ⟶442

The request includes a playable URL, and the method further includes, in response to receiving the request: (a) obtaining the manifest according to the playable URL; and parsing the manifest for the client device to extract one or more URLs corresponding to the one or more units, wherein a format of the manifest is agnostic to the client device ⟋450

Detect an update to the format; and parsing the manifest according to the update for the client device to extract the one or more URLs ⟋452

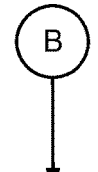

The request is a unit request transmitted by the client device while the client device downloads a set of units at a first bitrate; and the one or more units identified by the one or more servers correspond to a second bitrate according to the manifest ⟋460

The first bitrate is different from the second bitrate, and the method further includes: projecting the download of the set of units at the first bitrate does not satisfy a performance criterion based on the client conditions; and signaling the client device to cease downloading the set of units ⟋462

The parsed manifest is stored as a cached manifest in the non-transitory ⌐~470
memory, and the method further includes: receiving a subsequent request
from the client device; retrieving the cached manifest from the non-transitory
memory in response to receiving the subsequent request; and
identifying a set of units according to the cached manifest without
parsing.

Substitute the one or more units with alternative content, wherein signaling to ⌐~480
the client device the one or more units to download includes signaling to the
client device the alternative content to download

Establish a communication channel between the client device and the server
to receive the request, wherein signaling to the client device the one or more ⌐~490
units to download includes providing, via the communication channel, one or
more URLs extracted from the manifest corresponding to the one or more
units and directed to a content delivery network (CDN)
⌐~492
The communication channel is a stateless communication channel, and
the request includes cookies indicating the client conditions

Figure 4C

CLOUD MEDIA PLAYER

TECHNICAL FIELD

The present disclosure relates generally to multimedia content delivery and, more specifically, to a cloud media player.

BACKGROUND

Previously existing adaptive bitrate (ABR) players for playing videos typically run on client devices. Videos come in many formats, such as HTTP Live Streaming (HLS), Dynamic Adaptive Streaming over HTTP (DASH), MP4, Transport Stream (TS), and more. Activities associated with playing videos on the client devices, such as player logging, interpreting various video formats, and downloading updates, etc. often consume a significant amount of computational resources and storage space on client devices. For thin client devices, limited local resources place constraints on the performance of playing various types of videos.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 4A-4C are flowcharts illustrating a method performed at the exemplary cloud media player for providing streaming media content to client devices, in accordance with some embodiments.

Figure 1:
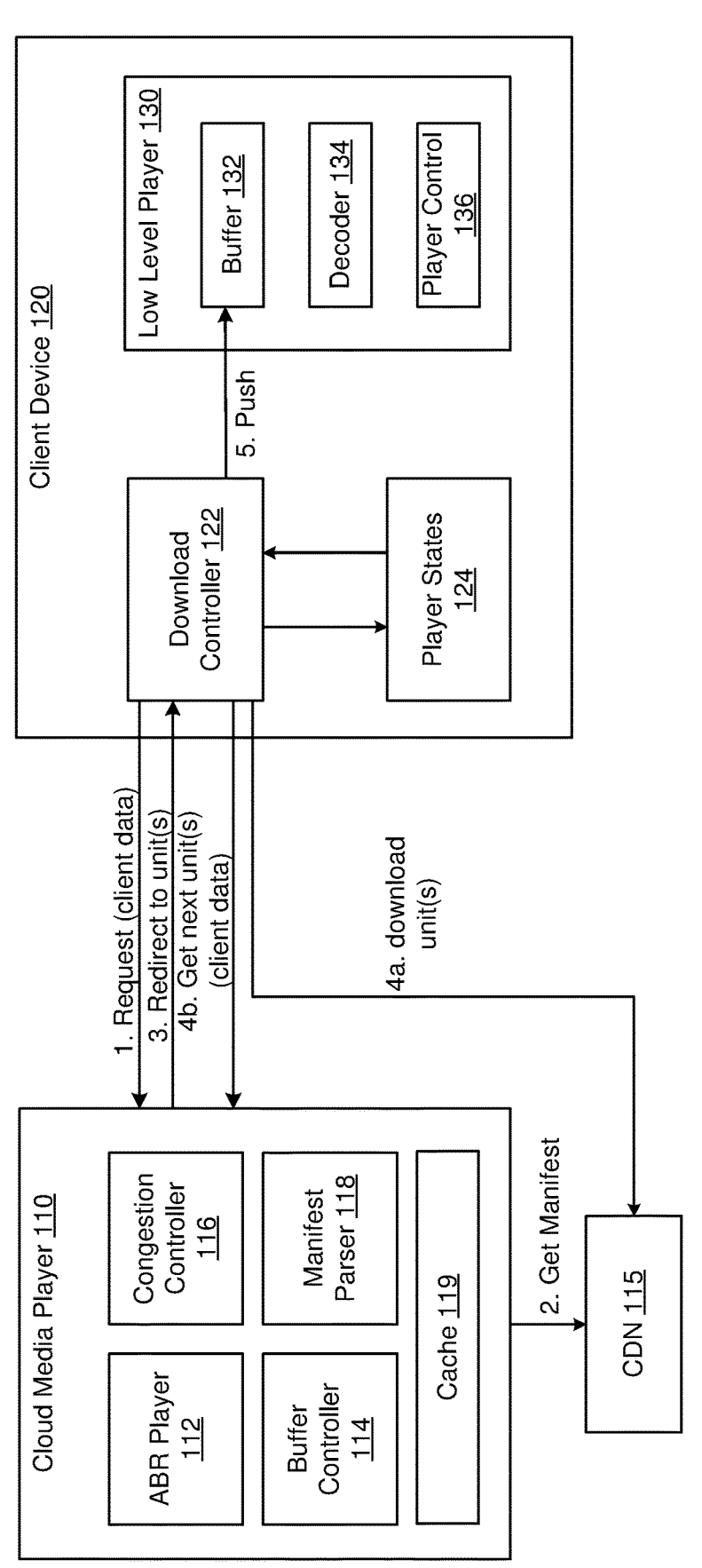
FIG. 1 is a block diagram of a multimedia content delivery system with an exemplary cloud media player, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

A cloud media player described herein addresses the aforementioned issues by running adaptive bitrate (ABR) players in the cloud for client devices. In some embodiments, through a communication channel between the cloud media player and a client device, the client device informs the cloud of client conditions, e.g., buffers, download bitrate, and/or network statistics, etc. The communication channel allows the cloud media player to route client requests to proper units for downloading. Furthermore, the communication channel allows the cloud media player to signal the client device about ongoing download(s) when necessary, e.g., canceling a download, pausing a download, deleting packets as part of buffer management, and/or starting to download an alternative unit, etc.

In accordance with various embodiments, a method is performed at a cloud media player hosted by one or more servers that include one or more processors and a non-transitory memory. The method includes the cloud media player receiving a request to play a media content item at a client device. The method further includes the cloud media player identifying, based at least in part on client conditions at time of the request, one or more units of the media content item for the client device to download according to a manifest obtained and parsed by the one or more servers. The method additionally includes the cloud media player signaling to the client device the one or more units to download.

EXAMPLE EMBODIMENTS

Methods, devices, and systems in accordance with various embodiments described herein allow a cloud media player to perform computationally resource-intensive tasks related to playing multimedia in the cloud for client devices. In some embodiments, in response to a request for content from a client device, the cloud media player obtains a manifest associated with the content and parses the manifest to signal to the client relevant unit(s) to download. In some embodiments, when preparing to signal to the client device which unit(s) to download, the cloud media player determines the bitrate for the download based on the amount of data in client buffers and network capabilities as reported by the client device via a communication channel between the cloud and the client device and/or as reported by other network devices in the system. Based on the determined bitrate, the cloud media player directs the client device to download unit(s) corresponding to the bitrate such as from a content delivery network (CDN). In some embodiments, the cloud media player further determines network conditions and decides to redownload unit(s) on a different bitrate to ensure continuous playback, e.g., to avoid buffer overflow or underflow. Thus, the cloud media player described herein performs computationally resource-intensive tasks, such as congestion control, buffer management, manifest parsing, and more, in the cloud and supports multiple manifest formats and/or multiple media content formats. This reduces the load on client devices and reduces the frequency of updates to the client devices in the content delivery system.

Reference is now made to FIG. 1, which is a block diagram of an exemplary multimedia content delivery system 100 in accordance with some embodiments. In some embodiments, the multimedia content delivery system 100 includes a cloud media player 110 (e.g., on one or more servers at a headend), a content delivery network (CDN) 115, and a plurality of client devices including an exemplary client device 120 connecting remotely to the cloud media player 110 and/or the CDN 115, e.g., via a wired connection and/or a wireless connection. As used herein, multimedia content, which is referred to hereinafter as "media content", "media content item(s)", "media asset", or "content", is prepared by one or more servers in the cloud (e.g., a headend) and received by the client device 120, e.g., via the CDN 115. The multimedia content can include any multimedia data, such as visual data, audio data, and/or text, etc. Further, the multimedia content can be delivered in a variety of formats.

For example, an encoder (not shown in FIG. 1) in the cloud can encode or re-encode the content according to various video and/or audio encoding standards such as advanced video encoding (AVC), versatile video coding (VVC), high efficiency video coding (HEVC), AOMedia video 1 (AV1), VP9, MPEG-2, MPEG-4, MP3, AC-3, etc. Further, a packager (not shown in FIG. 1) in the cloud can package the encoded content according to Common Media Application Format (CMAF), CMAF low latency format, HTTP Live Streaming (HLS), Low Latency HTTP Live Streaming (LL-HLS), Smooth Streaming, or HTTP Dynamic Streaming (HDS) format and construct manifests in accordance with HLS or DASH. In preparation for the transition of the content, in some embodiments, the encoder encodes content items to elementary streams, and the elementary streams are then packetized into packets for transmission by a transmitter (not shown).

Regardless of the format of the multimedia content and/or the format of the manifests, the cloud media player 110 described herein can support and facilitate the playing of any multimedia content on the client device 120. This includes parsing different formats of manifests that reference various playout formats of the multimedia content. Furthermore, in case of any updates and/or upgrades such as changing the manifest from a first format to a second format, the cloud player 110 can identify the unit(s) for download based on the parsed manifest, once the manifest parser in the cloud is updated and/or upgraded. As used herein, a unit can be a segment, a partial segment, a block, a frame, a picture, a group of pictures (GOP), a chunk, a fragment, a file, an access unit (AU), and/or a time unit, etc. As a result, the client device 120 becomes agnostic to the formats of the multimedia content and/or the formats of the manifests, which reduces the amount and frequency of updates required for changes in the exemplary content delivery system 100.

In some embodiments, the client device 120 includes a TV, a set-top-box (STB), a mobile device, a console, and/or a computing device with a download controller 122, a low level player 130, and a player states storage 124 for storing conditions of a low level player 130, e.g., buffer conditions, the buffer decoding frame pointer, the frame being played, etc. In some embodiments, the download controller 122 downloads packets transmitted by the cloud media player 110 and pushes the downloaded packets to a buffer 132 in the low level player 130 in preparation for playout. In some embodiments, the low level player 130 is configured to retrieve packets from the playout buffer 132, decrypt and/or decode the packets, e.g., by a decoder 134 in the low level player 130.

As the download controller 122 pushes the downloaded packets to the buffer 132 and the decoder 134 decodes the packets in the buffer 132, the low level player 130 records the status of the buffer 132 to the player states storage 124. In some embodiments, the low level player 130 further includes a player control module 136 to receive play, pause, seek, and/or other trick mode play commands and control the presentation of the decoded packets according to the commands. Though not shown in FIG. 1, in some embodiments, the low level player 130 also includes a demultiplexer to process the media stream received via the download controller 122 and generates elementary bitstreams for the decoder 134 along with providing clock reference, presentation timing information, and other program and service information tables related to the broadcasting service operation.

In some embodiments, to serve playout requests from the client device 120, the cloud media player 110 includes an adaptive bitrate (ABR) player 112, a buffer controller 114, a congestion controller 116, a manifest parser 118, and a cache 119. In some embodiments, the ABR player 112 emulates a player to play ABR videos for purposes such as requesting manifests, compositing user interface videos, and/or performing digital rights management protection of the ABR videos (e.g., obtaining and/or providing licenses). In some embodiments, a user interface (UI) engine (not shown) in the cloud obtains the ABR videos from the ABR player 112 (or a different ABR player) and uses the ABR videos for generating user interface (UI) videos for the client device 120. In some embodiments, in order to render UIs for multiple client devices 120 in the cloud, a pool of UI engines hosted by virtual machines running on top of hardware (e.g., CPU(s) and/or GPU(s)) of the server(s) in the cloud and executes programs or instructions for UI rendering. In some embodiments, each of the virtual machines corresponds to one application for UI rendering. An application as used herein refers to an executable program, or a listing of instructions for execution, that defines a UI for display on the client side. In such embodiments, multiple instances of the application in the cloud serve as virtual STBs for the client devices 120 to render UIs for the client devices 20 and generate UI videos for the client devices 120 to download. As such, the origin of the media content that is viewed on the client device 120 via the cloud media player 110 can be from the CDN 115 or a backend server, including a UI server hosting a UI engine for generating custom UIs. Consequently, the protocol for the communication channel between the cloud media player 110 and the client device 120 varies in accordance with various embodiments, e.g., HTTP for buffered content and/or WebRTC for low latency content, signaling, commands, requests, or client data.

In some embodiments, the ABR player 112 receives play commands from the client device 120, e.g., the commands received by the player control module 136 and sent to the cloud media player 110, and coordinates with the congestion controller 116 and the buffer controller 114 for determining the position and location of the unit(s). In some embodiments, the congestion controller 116 determines client network capacities and coordinates with the buffer controller 114 for controlling the buffer 132 on the client device 120 in accordance with some embodiments. Based on the client data reported by the client device 120, aggregated data obtained by the cloud media player 110 (e.g., cloud player logging in the cloud), and/or instructions from applications in the cloud (e.g., a third-party application for advertisement substitution), the congestion controller 116 and/or the buffer controller 114 determine the appropriate bitrate for the client device 120. In some embodiments, the manifest parser 118 is configured to parse manifests and provide support to multiple formats of the manifests. The manifests used for content streaming, whether parsed or not parsed, are stored in the cache 119 for performance enhancements in accordance with various embodiments.

As shown in FIG. 1, to play a media content item, the client device 120 sends a request to the cloud media player 110 in step 1. In some embodiments, the request includes a playable URL for playing a media content item. For example, the playable URL can include a media content item identifier and/or command(s) associated with playing the media content item. In some embodiments, the request also indicates parameter(s) for the commands. For example, the parameter can be a time window range, a position to play the media content item at the client device 120 for seek command, etc. In some embodiments, the client device 120 obtains the playable URL from an application, e.g., a media player application on the client device 120 or a UI engine in the cloud. When sending the request, in some embodiments the client device 120, e.g., the download controller 122, packages the playable URL and attaches the client conditions, e.g., buffer conditions obtained from the player states storage 124, as well as network conditions obtained by the download controller 122 while downloading content. In some embodiments, instead of attaching the client conditions to the playable URL, the client conditions can be sent separately. For example, the client device 120 can send the client conditions at certain time intervals. In another example, the client device 120 can send the client conditions with requests for each segment(s) to keep the cloud media player 110 informed of the presentation status at the client device 120. The reporting by the client device 120 allows the cloud to track the buffer and/or network conditions and to determine the appropriate action(s) for the downloads, e.g., determining the bitrate of the next segment to download, signaling the client device 120 to abort the current download and/or re-download a segment with a different bitrate, etc.

For example, the download controller 122 can obtain from the player states storage 124 the size and depth of the buffer 132, e.g., the number of frames and/or bits in the buffer 132, decoded packet counter, successfully decoded frames, the frame being played, etc. In another example, the download controller 122, while downloading the packets, can obtain client data such as packet loss, historical (e.g., time window) of successful bitrate, video stalls, CPU usage allocated to video processing, bandwidth allocation to content stream downloads, Wi-Fi signal strength, etc. In some embodiments, the download controller 122 attaches the cookies to the playable URL as part of the request to the cloud media player 110 so that the cloud media player 110 can use the cookies to store states of the session. As such, the client device 120 is agnostic of the format of the playable URL.

In response to receiving the request, in step 2 shown in FIG. 1, the cloud media player 110 (e.g., the congestion controller 116 coordinating with the ABR player 112 and/or the manifest parser 118) sends a request to the CDN 115 to obtain a manifest for playing the requested media content item. Upon obtaining the manifest, the manifest parser 118 parses the manifest, and coordinates with the buffer controller 114 and the congestion controller 116 to match the client conditions with available bitrates specified in the manifest in accordance with some embodiments. The cloud media player 110 the returns to the client device 120, e.g., via a stateful or stateless communication channel between the congestion controller 116 and the download controller 122, URL(s) of the located unit(s), so that the download controller 122 is redirected to download the unit(s) from CDN 115 in step 4a. e.g., downloading segment N.

In some embodiments, while downloading the unit(s), e.g., performing step 4a and step 4b in parallel, the download controller 122 requests the URL(s) of the next unit(s), e.g., requesting segment N+1, as well as sends the current client conditions to the cloud media player 110 in step 4b.

Similar to the client data sent in step 1, in some embodiments, the client conditions sent in step 4b include conditions of the buffer 132 in the low level player 130 and/or network conditions. In some embodiments, upon receiving the downloaded unit(s), the download controller 122 pushes the downloaded unit(s) to the buffer 132 for playout in step 5. In some embodiments, the request to and the response from the cloud media player 110 are for multiple units, thus allowing the client device 120 to download the multiple units in parallel for improved efficiency. In such embodiments, the current client conditions can be sent at a different intervals from the requests for the next unit(s). The reporting of the client conditions to the cloud media player 110 allows the cloud to make and/or change the decision while downloading the current set of unit(s), even before the client device 120 requests the next set of unit(s).

As shown in FIG. 1, the system 100 splits tasks performed by a conventional client-based player between the client device 120 and the cloud media player 110. As a result, less computationally resource-intensive media streaming and processing tasks, such as player control and other low level player functions, are still performed by the client device 120, e.g., by the low level player 130, while tasks such as bitrate selection, buffer management, and manifest parsing, etc. that require more computational resources are performed in the cloud by the cloud media player 110. Consequently, the system 100 allows thin client devices, e.g., client devices with limited processing power and capacity, to efficiently obtain and play media content items. Further, when updates are applied to the cloud media player 110 in the cloud, e.g., upgrades, security patches, supports for newer media content formats, and/or enhanced manifest parsing for different manifest formats, etc., a plurality of client devices 120 benefits from the updates, thus requiring less updates to the clients and reducing network traffic, processing time, and storage requirements on the client side for accommodating changes in the content delivery system 100.

In FIG. 1, although a single cloud media player 110, a single CDN 115, and a single client device 120 are illustrated, the system 100 can include one or more cloud media players 110, a plurality of client devices 120, and one or more CDNs 115. In some embodiments, each cloud media player 110 can host one or more instances of the ABR player 112, the buffer controller 114, the congestion controller 116, the manifest parser 118, and/or the cache 119. Content storage units 112 and/or one or more metadata storage units 114. Alternatively, one or more instances of the ABR player 112, the buffer controller 114, the congestion controller 116, the manifest parser 118, and/or the cache 119 can be shared by multiple instances of the cloud media player 110. Further, each instance of the ABR player 112, the buffer controller 114, the congestion controller 116, the manifest parser 118, and/or the cache 119 can reside on the same server or are distributed over multiple servers. For the sake of simplicity, the subject matter will be described hereinafter for the most part with reference to a single cloud media player 110, a single client device 120, and a single CDN 115. Also in FIG. 1, although the CDN 115 as the content origin is shown as separate from the cloud media player 110, the content origin can be on the server or server cluster hosting the cloud media player 110, e.g., one or more servers at the headend. Additionally, the cloud media player 110 described herein can be implemented on one or more servers anywhere in the content delivery system 100, such as at the headend, the CDN 15, and/or an edge device.

Figure 2:
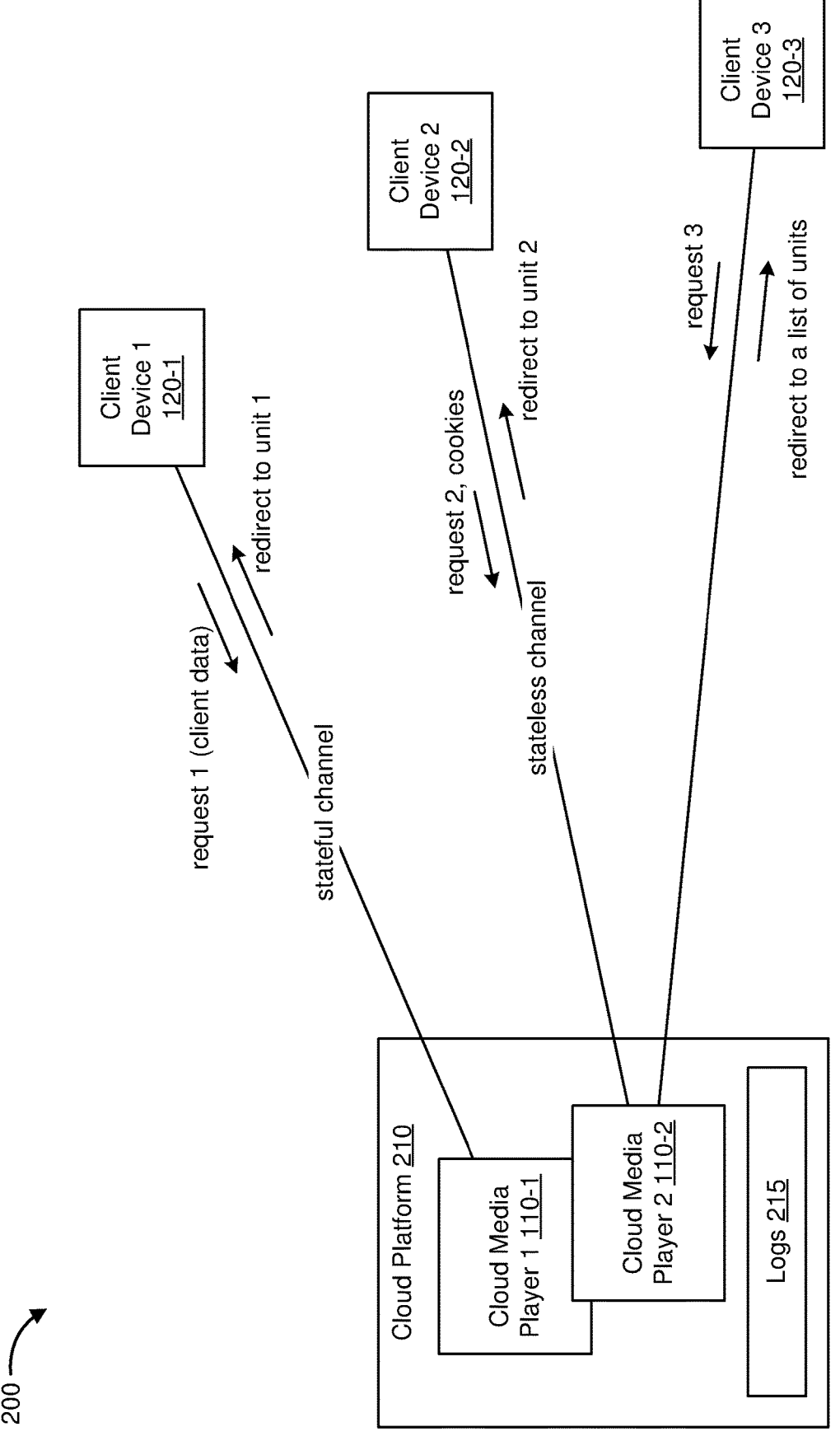
FIG. 2 is a block diagram illustrating content delivery from a cloud platform with multiple cloud media players, in accordance with some embodiments.

FIG. 2 is a block diagram 200 illustrating content delivery from a cloud platform with multiple cloud media players. In FIG. 2, a cloud platform 210 includes multiple instances of the cloud media player 110 as described above with reference to FIG. 1, e.g., at least cloud media player 1 110-1 and cloud media player 2 110-2. The cloud media players 110-1 and 110-2 serve multiple client devices 120 as described above with reference to FIG. 1, e.g., cloud media player 1 110-1 serving at least client device 1 120-1 and cloud media player 2 110-2 serving at least client device 2 120-2 and client device 3 120-3. In some embodiments, the cloud platform 210 pools the cloud media players 120 so that resources can be shared, allocated, and re-allocated among different instances, e.g., sharing the cache 119 (FIG. 1) and/or sharing the logging information recorded by the cloud media players 110 in a logs storage 215. Further, in some embodiments, by pooling the resources, the cloud platform 210 performs load balancing by allocating a respective cloud media player 110 to serve the requests from a set of client devices 120 and returning the respective cloud media player 110 to the pool to free up resources. Once the cloud platform 210 selects a cloud media player 110 to serve a request from a respective client device 120, in some embodiments, a communication channel (stateful or stateless) is established between the respective client device 120 and the cloud media player 110.

For example, in FIG. 2, a stateful communication channel can be established between cloud media player 1 110-1 and client device 1 120-1, e.g., over a WebRTC connection. In some embodiments, when the presentation of the requested content requires low latency, e.g., in the 200 ms-300 ms range, WebRTC is chosen as the communication protocol and a stateful communication channel over the WebRTC connection is established for exchanges such as request 1, the client data, the URL to direct client device 1 120-1 to download unit 1, and/or unit 1. In another example, a stateless communication channel can be established between cloud media player 2 110-2 and client device 2 120-2, e.g., over an HTTP connection. In some embodiments, when the latency requirement is above a threshold, HTTP is chosen as the communication protocol and a stateless communication channel over the HTTP connection is established for exchanges such as request 2, the client data, the URL to direct client device 2 120-2 to download unit 2, and/or unit 2.

Using the stateful communication channel, cloud media player 1 110-1 (e.g., the congestion controller 116, FIG. 1) can pick up on data being lost during packet transmission and scale up or down the transmission bitrate. On the other hand, in some embodiments, when a stateless communication channel is established, cloud media player 2 110-2 uses cookies to preserve session data while remaining stateless, e.g., cookies indicating the screen being displayed, download bitrate, network statistics, the frame pointer in the buffer 132 (FIG. 1), etc.

In some embodiments, the client device 120 sends client data to the cloud platform 210 when requesting to play content, e.g., client device 1 120-1 sending client data to cloud media player 1 110-1 along with request 1 or client device 2 120-2 sending cookies representing session information attached to request 2. On the other hand, in some other embodiments, the client device 120 does not attach the client data to the request, e.g., request 3 sent by client device 3 120-3 to cloud media player 2 110-2 not having client data indicating client status. When client device 3 120-3 does not share as much status with the server, e.g., limited client data or not having client data attached to the request, in some embodiments, cloud media player 2 110-2 processes the playable URL, parses the manifest, and constructs a list of URLs from the manifest to be returned to client device 3 120-3, e.g., a list of URLs corresponding to multiple bitrate segments or partial segments. Upon receiving the list, in some embodiments, client device 3 120-3 selects the proper segment from the list to download based on client status, e.g., the download controller 122 (FIG. 1) selecting a segment based on local network and buffer conditions indicated by the low level player 130 (FIG. 1) and the status from the player states storage 124 (FIG. 1). As such, in some embodiments, instead of the server making the decision for the client, client device 3 120-3 performs the selection based on locally available information.

In some embodiments, when the client device 120 is not sharing sufficient client data, the cloud media player 110 makes decisions for the client device 120 by analyzing the player logging information stored in the logs storage 215. In some embodiments, the logs storage 215 stores aggregated client data from past player activities from a particular client device 120 or from a plurality of client devices 120. Based on the performance history at a particular client device 120 and/or based on performance history at similarly configured or situated client devices, the cloud media player 110 determines for the client device 120 the bitrate for downloads.

For example, based on recorded client data stored in the logs storage 215, where the recorded client data are reported by a particular client device 120 over time, e.g., the historical performance of the particular client device 120, the cloud media player 110 can decide for the particular client device 120 the bitrate for downloads and can send to the client device 120 a URL of the segment corresponding to the bitrate as specified in a server-side parsed manifest. In another example, based on recorded client data from a plurality of client devices 120, e.g., aggregated data, the cloud media player 110 can decide for a particular client device the bitrate for downloads based on the client data received from similarly configured client devices, client devices having the same model number and/or firmware versions, similarly located client devices, e.g., client devices located in the same geographical region, and/or similarly situated client devices, client devices streaming the same popular event, etc. In yet another example, the client status used by the cloud media player 110 can include not only the client data about a respective client device 120, but also the client connectivity data to the rest of the system, such as the network connection to the CDN 115 (FIG. 1) or the cloud via an internet service provider (ISP) and/or a gateway device, etc.

As shown in FIG. 2, the channels for obtaining the client status are not limited to attaching the client data to the request. The frequency of the client data reporting can be different from the frequency of sending the request(s) for unit(s) and/or playable URLs, e.g., using a separate communication channel between the client device 120 and the cloud and/or sharing the same communication channel but sending the client data even when not requesting unit(s) or sending playable URL(s). Further, instead of relying on the client data reported by the client, the cloud media player 110 can obtain the client data related to the connectivity of the client device 120 to the cloud media player 110 and/or the CDN (FIG. 1) from other sources, such as the ISP, the gateway device, and/or an edge device.

Figures 3A, 3B, 3C:
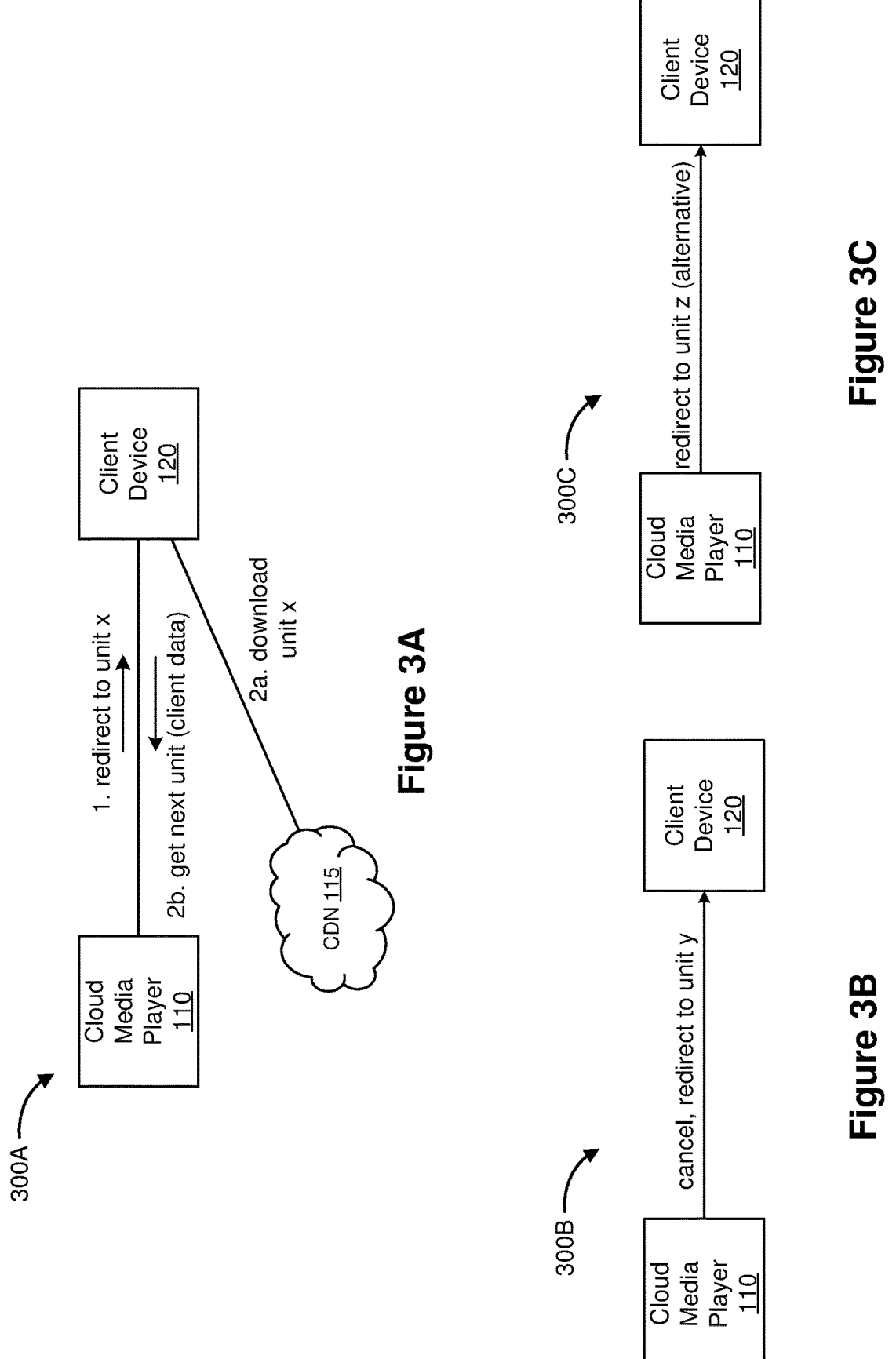
FIGS. 3A-3C are diagrams illustrating signaling by the exemplary cloud media player, in accordance with some embodiments.

FIGS. 3A-3C are diagrams 300A-300C illustrating signaling by the cloud media player 110 (FIGS. 1 and 2) in accordance with some embodiments. As shown in FIG. 3A, after receiving a URL from the cloud media player 110 directing the client device 120 to download unit x in step 1 following the method described above with respect to FIGS. 1 and 2, the client device 120 downloads unit x from the CDN 115 in step 2a. In the meantime, the client device 120 sends a get next unit request to the cloud media player 110 in step 2b. In some embodiments, the client device 120 attaches client data to the request, while in some other embodiments, as described above with reference to FIG. 2, the client data indicating the current client conditions can be sent through various channels and at a different time from the get next unit request.

As described above, the selection of which unit(s) to signal the client device 120 to download (e.g., segment(s) associated with audio language, videos, and/or subtitles) is handled by the cloud media player 110, e.g., based on the client data received from the client device 120. In some embodiments, based on the client data and/or in response to receiving the get next unit request, the cloud media player 110 determines that the bitrate selected for the current download does not satisfy a performance criterion, e.g., network congestion, buffer overflow or underflow, etc., and selects a different bitrate for the download. For example, as shown in FIG. 3B, upon determining that the client device is projected to have buffer overflow or underflow with the current unit download in progress, the cloud media player 110 signals the client device 120 to abort the current unit download, e.g., signaling to cancel downloading unit x, and redirects the client device 120 to download an alternative unit, e.g., unit y, specified in the manifest corresponding to a different bitrate. In another example, as shown in FIG. 3C, the cloud media player 110 can insert alternative content without the client being aware of the substitution, e.g., redirecting the client device 120 to download unit z from the alternative content. The alternative content can include, for example, advertisements, alerts, and/or different variations of the content (e.g., multiple ending options of a movie). In some embodiments, the alternative content is communicated to the cloud media player 110 and signaled to the client device 120, so that the client device 120 does not consume storage capacities for storing the alternative content and/or process the content for insertions and/or substitution of the alternative content, e.g., performing splicing on the server side.

FIGS. 4A-4C are flowcharts illustrating a method 400 performed at the cloud media player 110 (FIGS. 1-2 and 3A-3C) for providing streaming media content to client devices in accordance with some embodiments. In some embodiments, the cloud media player 110 as described above with reference to FIGS. 1-2 and 3A-3C is hosted on one or more servers that include one or more processors and a non-transitory memory for caching purposes and/or for storing logs and/or metrics, as represented by block 410. In some embodiments, as part of the metrics, the network metrics includes not only the statistics obtained and/or reported by the client device, but also the any statistics from the network connecting the client device to the server, e.g., from a router, a modem, a gateway, an internet service provider (ISP), etc. The method 400 starts with the cloud media player receiving a request to play a media content item at a client device as represented by block 420. For example, in step 1 shown in FIG. 1, the client device 120 requests a media content item by sending a playable URL to the cloud media player 110. In another example, in step 4b shown in FIG. 1, while downloading and/or processing the downloaded unit(s), the download controller 122 sends a request for the next unit(s) to the cloud media player 110.

The method 400 continues, as represented by block 430, with the cloud media player identifying, based at least in part on client conditions at time of the request, one or more units of the media content item for the client device to download according to a manifest obtained and parsed by the one or more servers. For example, in step 3 shown in FIG. 1, the cloud media player 110 (e.g., the congestion controller 116 coordinates with the buffer controller 114) identifies unit(s) based on client data and redirects the client device 120 to download the unit(s).

In some embodiments, as represented by block 432, the client conditions indicate buffer conditions on the client device and network statistics associated with downloading the media content item, and the client conditions are sent to the one or more servers along with the request. For example, in FIG. 1, the download controller 122 retrieves buffer conditions associated with the buffer 132 and/or the decoder 134 from the player states storage 124 and reports the buffer conditions along with the network conditions associated with the downloads of the requested media content item to the cloud media player 110 in steps 1 and 4b. In another example, as shown in FIG. 2, client device 1 120-1 sends the client data along with request 1 to cloud media player 1 110-1, e.g., the client data attached to the playable URL. In yet another example, in FIG. 2, client device 2 120-2 packages the client data as cookies and sends the cookies along with request 2 to cloud media player 2 110-2.

In some embodiments, as represented by block 434, at least a portion of the client conditions is derived from client statistics associated with a network connecting the client device to the one or more servers. For example, as shown in FIG. 2, the cloud platform 210 records reported client data from client device 1 120-1, client device 2 120-2, and/or client device 3 120-3 in the logs storage 215. In the case of client device 3 120-3 not reporting (or not reporting sufficient client conditions), cloud media player 2 110-2 can estimate, infer, and/or derive at least a portion of the client conditions based on the aggregated client data from the logs storage 215 when determining the bitrate of the units to download for client device 3 120-3, e.g., network connectivity statistics from ISP, CDNs, routers, modems, gateway devices, and/or edge devices in addition to the client device 3 120-3.

In some embodiments, as represented by block 436, identifying the one or more units of the media content item includes, parsing the manifest to obtain bitrate options corresponding to the one or more units, and match the client conditions with the bitrate options to identify the one or more units corresponding to a respective bitrate. For example, in FIG. 1, the manifest parser 118 obtains a manifest in step 2 in response to the request received in step 1 and parses the manifest to determine the unit(s) for the client device 120 to download. When parsing the manifest, the manifest parser 118 takes the client conditions into consideration and matches the client conditions such as the buffer conditions and/or the network conditions, etc. with the bitrate options specified in the manifest to select the unit(s) that correspond to the optimal bitrate for the client device 120 to download.

In some embodiments, as represented by block 438, the request indicates a position of playing the media content item at the client device; and identifying the one or more units of the media content item for the client device to download according to the manifest includes locating the one or more units corresponding to the position. For example, in FIG. 1, the player control 136 can receive commands, such as play, pause, seek, and/or other trick mode commands. When sending the request to the cloud media player 110, the client device 120 also sends the commands, such as a time window range, or seek so that the cloud media player 110 locates the correct segment or other unit at the requested position.

Still referring to FIG. 4A, the method 400 continues, as represented by block 440, with the cloud media player signaling to the client device the one or more units to download. In some embodiments, as represented by block 442, the one or more units to download include multiple bitrate options; and signaling to the client device the one or more units to download includes causing the client device to select an option from the multiple bitrate options to download based on local buffer and network conditions. For example, as shown in FIG. 2, client device 3 120-3 makes decisions on the client side based on local client buffer and network conditions. In such embodiments, cloud media player 2 110-2 sends to client device 3 120-3 multiple bitrate options from the parsed manifest, e.g., constructing segment URLs corresponding to multiple bitrate options, and client device 3 120-3 selects the proper bitrate option to download based on the local client conditions, e.g., the buffer conditions stored in the player states storage 124 and the network conditions detected by the download controller 122 in FIG. 1.

Turning to FIG. 4B, as represented by block 450, in some embodiments, the request includes a playable URL, and the method 400 further includes, in response to receiving the request, obtaining the manifest according to the playable URL, and parsing the manifest for the client device to extract one or more URLs corresponding to the one or more units, wherein a format of the manifest is agnostic to the client device. For example, as shown in FIG. 1, the cloud media player 110 (e.g., the manifest parser 118) requests a manifest on behalf of the client device 120 in step 2 in response to the request received in step 1, and processes the manifest to identify the unit(s) for redirecting the client device 120 to in step 3. In some embodiments, as represented by the block 452, the method 400 further includes detecting an update to the format (e.g., a format change due to a new standard or upgrades, etc.), and parsing the manifest according to the update for the client device to extract the one or more URLs. As such, the cloud media player processes the manifest and supports multiple formats of the manifest (e.g., DASH, HLS, etc.), thus removing the need to interpretating various video and/or manifest formats and/or downloading updates by the client device.

In some embodiments, as represented by block 460, in some embodiments, the request is a unit request transmitted by the client device while the client device downloads a set of units at a first bitrate; and the one or more units identified by the one or more servers correspond to a second bitrate according to the manifest. For example, in FIG. 1, while downloading the unit(s) in step 4a, the client device 120 sends the client data to the cloud media player 110 when requesting the next unit(s) in step 4b. The cloud media player 110 then determines the bitrate for the next unit(s) based on the current client conditions at the time of the request. As such, to ensure continuous playout, as represented by block 462, in some embodiments, the first bitrate is different from the second bitrate, e.g., each unit(s) can have different bitrates. Further as represented by block 462, in such embodiments, the method 400 further includes, projecting the download of the set of units at the first bitrate does not satisfy a performance criterion based on the client conditions, and signaling the client device to cease downloading the set of units.

The projection allows the cloud media player to route the client requests to the proper unit(s) to download as well as signal to the client device to make changes to an ongoing download when necessary. For example, as shown in FIGS. 3A and 3B, the cloud media player 110 decides that based on the current download speed and buffer conditions, the buffer on the client device 120 is projected to have buffer underflow or overflow. Accordingly, the cloud media player 110 determines that it is necessary to cancel or pause the current ongoing download of unit x so that the buffer on the client device 120 can be freed up or filled up. The cloud media player 110 further decides on the bitrate of the next unit y for the client device 120 to download and notifies the client device 120 to abort the current download of unit x and start the download of unit y.

Turning to FIG. 4C, as represented by block 470, in some embodiments, the parsed manifest is stored as a cached manifest in the non-transitory memory (e.g., the cache 119, FIG. 1), and the method 400 further includes: receiving a subsequent request from the client device; retrieving the cached manifest from the non-transitory memory in response to receiving the subsequent request; and identifying a set of units according to the cached manifest without parsing. As such, once cached, the parsed manifest can be used for subsequent request to improve the efficiency of locating next unit(s) for the client device to download.

In some embodiments, as represented by block 480, the method 400 further includes substituting the one or more units with alternative content, wherein signaling to the client device one or more units to download includes signaling to the client device the alternative content to download. For example, as shown in FIGS. 3A and 3C, the cloud media player 110 can insert unit z from alternative content (e.g., advertisements, alerts, different ending options based on polls of the audience, etc.) to the client device 120 without the client being aware.

In some embodiments, as represented by block 490, the method further includes establishing a communication channel between the client device and the server to receive the request, wherein signaling to the client device the one or more units to download includes providing, via the communication channel, one or more URLs corresponding to the one or more units and directed to a CDN. As such, as shown in FIG. 1, upon receiving the request to download content from the client device 120, the cloud media player 110 re-routes the client device 120 to download the appropriate unit(s) directly from the CDN 115 by providing the URLs to the unit(s) to the client device 120 via a communication channel between the cloud media player 110 and the client device 120. The client device 120 also utilizes the communication channel to keep the cloud media player 110 informed of the client conditions, such as buffer conditions, current download bitrate, network statistics, etc. The communication channel can be stateful (e.g., over a WebRTC connection) or stateless (e.g., over an HTTP connection). In some embodiments, as represented by block 492, when the communication channel is a stateless communication channel, the request includes cookies indicating playout status at the client device, and the cookies are sent over the stateless communication channel. As such, the cloud media player can use cookies to preserve session data while remaining stateless.

Figure 5:
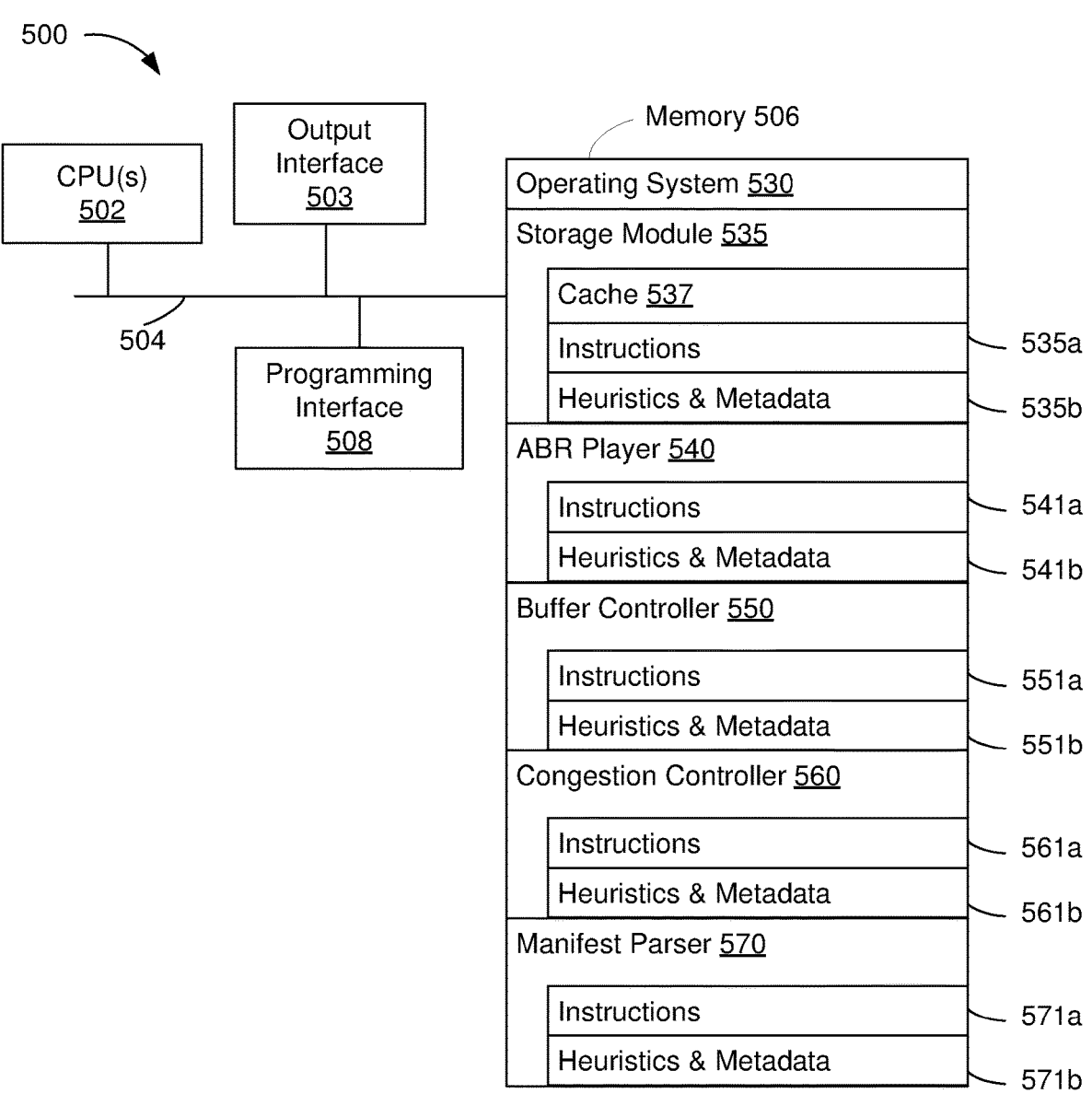
FIG. 5 is a block diagram of a computing device for hosting a cloud media player, in accordance with some embodiments.

FIG. 5 is a block diagram of a computing device 500 for hosting a cloud media player in accordance with some embodiments. In some embodiments, the computing device 500 corresponds to the cloud media player 110 in FIG. 1 and performs one or more of the functionalities described above with respect to the cloud media player. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 500 includes one or more processing units (CPU's) 502 (e.g., processors), one or more output interfaces 503 (e.g., one or more network interfaces), a memory 506, a programming interface 508, and one or more communication buses 504 for interconnecting these and various other components.

In some embodiments, the communication buses 504 include circuitry that interconnects and controls communications between system components. The memory 506 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506 comprises a non-transitory computer readable storage medium. Moreover, in some embodiments, the memory 506 or the non-transitory computer readable storage medium of the memory 506 stores the following programs, modules and data structures, or a subset thereof including an optional operating system 530, a storage module 535, a receiving unit 540, and a targeted content selector 550. In some embodiments, one or more instructions are included in a combination of logic and non-transitory memory. The operating system 530 includes procedures for handling various basic system services and for performing hardware dependent tasks.

In some embodiments, the storage module 535 is configured to store and/or manage a cache 537 (e.g., the cache 119, FIG. 1). In some embodiments, the cache 537 stores parsed or unparsed manifests for improved performance. In some embodiments, the storage module 535 is also configured to provide storage for storing logs (e.g., the logs storage 215, FIG. 2) or metrics. To that end, the storage module 535 includes a set of instructions 539a and heuristics and metadata 539b.

In some embodiments, the ABR player 540 (e.g., the ABR player 112, FIG. 1) is configured to emulate ABR content play in the cloud. To that end, the ABR player 540 540 includes a set of instructions 541a and heuristics and metadata 541b.

In some embodiments, the buffer controller 550 (e.g., the buffer controller 114, FIG. 1) is configured to obtain client buffer conditions and decide for the client the download bitrate so that the client buffer is filled up with content at a pace to avoid buffer overflow or underflow. To that end, the buffer controller 550 includes a set of instructions 551a and heuristics and metadata 551b.

In some embodiments, the congestion controller 560 (e.g., the congestion controller 116, FIG. 1) is configured to obtain client network conditions and coordinate with the buffer controller 550 to decide for the client the download bitrate so that the download speed is optimal for the client network metrics. To that end, the congestion controller 560 includes a set of instructions 561a and heuristics and metadata 561b.

In some embodiments, the manifest parser 570 (e.g., the manifest parser 118, FIG. 1) is configured to obtain and parse manifests and decides for the client the units to download based on the client conditions. To that end, the manifest parser 570 includes a set of instructions 571a and heuristics and metadata 571b.

Although the storage model 535, the ABR player 540, the buffer controller 550, the congestion controller 560, and the manifest parser 570 are illustrated as residing on a single computing device 500, it should be understood that in other embodiments, any combination of the storage model 535, the ABR player 540, the buffer controller 550, the congestion controller 560, and the manifest parser 570 can reside in separate computing devices in various embodiments. For example, in some embodiments, each of the storage model 535, the ABR player 540, the buffer controller 550, the congestion controller 560, and the manifest parser 570 resides on a separate computing device.

Moreover, FIG. 5 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first." "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at one or more servers hosting multiple instances of a cloud media player, wherein the one or more servers include one or more processors and a non-transitory memory:
receiving a request to play a media content item by a client media player at a client device, wherein the request includes client buffer conditions for playing the media content item by the client media player and a position to play at the client media player;
allocating an instance of the cloud media player to serve the request; and
emulating, by the instance of the cloud media player, to play the media content item, including:
requesting the media content item from a content delivery network (CDN) and obtaining from the CDN a manifest associated with the request;
identifying from the manifest, based at least in part on the client buffer conditions, one or more links to one or more units of the media content item, wherein the manifest is parsed by the one or more servers without being downloaded or parsed by the client device to identify the one or more links to the one or more units that have a bitrate specified in the manifest corresponding to the client buffer conditions and correspond to the position; and
signaling the one or more links to the client device for downloading the one or more units and playing the one or more units by the client player.

2. The method of claim 1, further comprising obtaining network statistics associated with downloading the media content item.

3. The method of claim 1, further comprising obtaining client conditions derived from client statistics associated with a network connecting the client device to the one or more servers.

4. The method of claim 1, wherein identifying from the manifest, based at least in part on the client buffer conditions, the one or more links to the one or more units of the media content item includes:
parsing the manifest to obtain bitrate options corresponding to the one or more units; and
matching the client buffer conditions with the bitrate options to identify the one or more units corresponding to the bitrate.

5. The method of claim 1, further comprising:
parsing the manifest to identify multiple bitrate options for the one or more units; and
causing the client device to select an option from the multiple bitrate options to download based on local buffer and network conditions.

6. The method of claim 1, wherein:
a format of the media content item is agnostic to the client device; and
the method further includes re-encoding the one or more units to a different format playable by the client media player.

7. The method of claim 1, further comprising:
detecting an update to a format of the manifest, wherein the format of the manifest is agnostic to the client device; and
parsing the manifest according to the update to the format for the client device to extract the one or more links.

8. The method of claim 1, wherein:
the request is a unit request transmitted by the client device while the client device downloads a set of units at a first bitrate; and
the one or more units identified by the one or more servers correspond to a second bitrate according to the manifest.

9. The method of claim 8, wherein the first bitrate is different from the second bitrate, and the method further includes:
projecting the download of the set of units at the first bitrate does not satisfy a performance criterion based on the client buffer conditions; and
signaling the client device to cease downloading the set of units.

10. The method of claim 1, wherein the parsed manifest is stored as a cached manifest in the non-transitory memory shared by multiple instances of the cloud media player, and the method further includes:
receiving a subsequent request for the media content item;
retrieving the cached manifest from the non-transitory memory in response to receiving the subsequent request; and
identifying a set of links to a set of units according to the cached manifest without parsing.

11. The method of claim 1, further comprising:
substituting the one or more links to the one or more units with a set of links to alternative content,
wherein signaling the one or more links to the client device includes signaling the set of links to the alternative content to the client device.

12. The method of claim 1, further comprising:
establishing a communication channel between the client device and the server to receive the request and the client buffer conditions, wherein the communication channel is separate from a channel used by the client device for downloading the one or more units,
wherein signaling the one or more links to the client device includes providing, via the communication channel, the one or more links directed to the CDN.

13. The method of claim 12, wherein the communication channel is a stateless communication channel, and the request includes cookies indicating playout status at the client device, and the cookies are sent over the stateless communication channel.

14. The method of claim 1, further comprising:
playing, by the instance of the cloud media player, the media content item according to the client buffer conditions for compositing a transition from the media content item to a user interface video for the client device.

15. A server hosting multiple instances of a cloud media player, the server comprising:
one or more processors;
a non-transitory memory; and one or more programs stored in the non-transitory memory, which, when executed by the one or more processors, cause the server to:

receive a request to play a media content item by a client media player at a client device, wherein the request includes client buffer conditions for playing the media content item by the client media player and a position to play at the client media player;

allocate an instance of the cloud media player to serve the request; and emulate, by the instance of the cloud media player, to play the media content item, including:

requesting the media content item from a content delivery network (CDN) and obtain from the CDN a manifest associated with the request;

identifying from the manifest, based at least in part on the client conditions, one or more links to one or more units of the media content item, wherein the manifest is parsed by the one or more servers without being downloaded or parsed by the client device to identify the one or more links to the one or more units that have a bitrate specified in the manifest corresponding to the client buffer conditions and correspond to the position; and signaling the one or more links to the client device for downloading the one or more units and playing the one or more units by the client player.

16. The server of claim 15, wherein the one or more programs, which, when executed by the one or more processors, further cause the server to obtain network statistics associated with downloading the media content item.

17. The server of claim 15, wherein the one or more programs, which, when executed by the one or more processors, further cause the server to obtain client conditions derived from client statistics associated with a network connecting the client device to the server.

18. The server of claim 15, wherein identifying from the manifest, based at least in part on the client buffer conditions, the one or more links to the one or more units of the media content item includes:

parsing the manifest to obtain bitrate options corresponding to the one or more units; and matching the client buffer conditions with the bitrate options to identify the one or more units corresponding to the bitrate.

19. A non-transitory memory storing one or more programs which, when executed by one or more servers hosting multiple instances of a cloud media player, cause the one or more servers to:

receive a request to play a media content item by a client media player at a client device, wherein the request includes client buffer conditions for playing the media content item by the client media player and a position to play at the client media player;

allocate an instance of the cloud media player to serve the request; and emulate, by the instance of the cloud media player, to play the media content item, including:

requesting the media content item from a content delivery network (CDN) and obtaining from the CDN a manifest associated with the request;

identifying from the manifest, based at least in part on the client buffer conditions, one or more links to one or more units of the media content item, wherein the manifest is parsed by the one or more servers without being downloaded or parsed by the client device to identify the one or more links to the one or more units that have a bitrate specified in the manifest corresponding to the client buffer conditions and correspond to the position; and signaling the one or more links to the client device for downloading the one or more units and playing the one or more units by the client player.

* * * * *